United States Patent
Brockman et al.

(10) Patent No.: US 6,614,894 B1
(45) Date of Patent: Sep. 2, 2003

(54) SYSTEM AND METHOD FOR MASS CALL ONSET DETECTION IN A COMMUNICATIONS NETWORK

(75) Inventors: Pierce Edward Brockman, Garland, TX (US); Lisan Lin, Carrollton, TX (US); Emil Alfred Baenz Ramirez, Plano, TX (US)

(73) Assignee: Inet Technologies, Inc., Richardson, TX (US)

( * ) Notice: Subject to any disclaimer, the term of this patent is extended or adjusted under 35 U.S.C. 154(b) by 0 days.

(21) Appl. No.: 09/092,428

(22) Filed: Jun. 5, 1998

(51) Int. Cl.[7] .............................................. H04M 15/00
(52) U.S. Cl. ................................ 379/112.06; 379/32.01; 379/32.03
(58) Field of Search .................. 379/111, 112.01, 379/112.03–112.06, 114.08, 114.09, 32.01–32.05, 229, 230

(56) References Cited

U.S. PATENT DOCUMENTS

| | | | |
|---|---|---|---|
| 5,008,929 A | 4/1991 | Olsen et al. | 379/112 |
| 5,333,183 A | 7/1994 | Herbert | 379/112 |
| 5,426,688 A | 6/1995 | Anand | 379/5 |
| 5,438,570 A | 8/1995 | Karras et al. | 370/94.2 |

(List continued on next page.)

FOREIGN PATENT DOCUMENTS

| WO | WO 96/21309 | 7/1996 | |
|---|---|---|---|
| WO | WO98/47275 | 10/1998 | H04M/7/00 |

OTHER PUBLICATIONS

U.S. patent application Ser. No. 09/092,256, Brockman et al.
U.S. patent application Ser. No. 09/092,699, Brockman et al.
U.S. patent application Ser. No. 09/094,122, Lawson et al.

Primary Examiner—Duc Nguyen
(74) Attorney, Agent, or Firm—Fulbright & Jaworski L.L.P.

(57) ABSTRACT

A system and method is disclosed for correlating transaction messages in a communications network into transaction records. A plurality of monitoring units capture the messages from the links in the communication network. A processor or state machine processes the correlated transaction records and detects calls to particular destination telephone numbers. Transactions affecting particular destination point codes can also be detected or monitored. When a short-term threshold number of calls to a particular telephone number are detected, the detecting monitor instructs other monitors to track calls to that telephone number. If a long-term threshold number of calls are detected for the destination telephone number, then a mass call alarm is generated. Information comprising the highly called destination telephone number, dialed number, destination point code, and top originating point codes is provided to the service provider following the mass call alarm. The system may direct an originating point code to drop a percentage of the calls that are directed to a highly called destination telephone number.

19 Claims, 5 Drawing Sheets

U.S. PATENT DOCUMENTS

| | | | |
|---|---|---|---|
| 5,448,624 A | 9/1995 | Hardy et al. | 379/67 |
| 5,457,729 A | 10/1995 | Hamann et al. | 379/2 |
| 5,473,596 A | 12/1995 | Garafola et al. | 370/13 |
| 5,475,732 A | 12/1995 | Pester, III | 379/34 |
| 5,488,648 A | 1/1996 | Womble | 375/13 |
| 5,521,902 A | 5/1996 | Ferguson | 370/13 |
| 5,539,804 A | 7/1996 | Hong et al. | 379/33 |
| 5,550,914 A | 8/1996 | Clarke et al. | 379/230 |
| 5,550,984 A | 8/1996 | Gelb | 395/200.17 |
| 5,579,371 A | 11/1996 | Aridas et al. | 379/34 |
| 5,590,171 A | 12/1996 | Howe et al. | 379/33 |
| 5,592,530 A | 1/1997 | Brockman et al. | 379/34 |
| 5,680,437 A | 10/1997 | Segal | 379/10 |
| 5,680,442 A | 10/1997 | Bartholomew et al. | 379/67 |
| 5,694,451 A | 12/1997 | Arinell | 379/34 |
| 5,699,412 A | 12/1997 | Polcyn | 379/89 |
| 5,703,939 A | 12/1997 | Bushnell | 379/113 |
| 5,706,286 A | 1/1998 | Reiman et al. | 370/401 |
| 5,712,908 A | 1/1998 | Brinkman et al. | 379/119 |
| 5,719,930 A * | 2/1998 | MacDonald et al. | |
| 5,729,597 A | 3/1998 | Bhusri | 379/115 |
| 5,737,399 A | 4/1998 | Witzman et al. | 379/112 |
| 5,757,895 A | 5/1998 | Airdas et al. | 379/136 |
| 5,793,771 A | 8/1998 | Darland et al. | 370/467 |
| 5,799,073 A | 8/1998 | Fleischer, III et al. | 379/113 |
| 5,822,401 A | 10/1998 | Cave et al. | 379/34 |
| 5,825,769 A | 10/1998 | O'Reilly et al. | 370/360 |
| 5,828,729 A | 10/1998 | Clermont et al. | 379/34 |
| 5,854,824 A | 12/1998 | Bengal et al. | 379/34 |
| 5,854,835 A | 12/1998 | Montgomery et al. | 379/119 |
| 5,867,558 A | 2/1999 | Swanson | 379/34 |
| 5,875,238 A | 2/1999 | Glitho et al. | 375/116 |
| 5,881,132 A | 3/1999 | O'Brien et al. | 379/35 |
| 5,883,948 A | 3/1999 | Dunn | 379/210 |
| 5,892,812 A | 4/1999 | Pester | 379/34 |
| 5,912,954 A | 6/1999 | Whited et al. | 379/115 |
| 5,920,613 A | 7/1999 | Alcott et al. | 379/114 |
| 6,018,519 A * | 1/2000 | Ginzboorg | |
| 6,028,914 A | 2/2000 | Lin et al. | 379/14 |
| 6,249,572 B1 | 6/2001 | Brockman et al. | |
| 6,411,604 B1 | 6/2002 | Brockman et al. | |

* cited by examiner

| KEY POINT CODE | KEY TID | TYPE | ALT POINT CODE | ALTERNATE TID | INSTRUCTIONS | TEMPORARY END | ALTERNATE SET |
|---|---|---|---|---|---|---|---|
| 51 | 52 | 53 | 54 | 55 | 56 | 57 | 58 |
| ... | ... | ... | ... | ... | ... | ... | ... |

50

59

SYSTEM AND METHOD FOR MASS CALL ONSET DETECTION IN A COMMUNICATIONS NETWORK

RELATED APPLICATIONS

The present invention is related to pending applications assigned Ser. No. 09/092,699, filed Jun. 5, 1998, entitled SYSTEM AND METHOD FOR SIGNAL UNIT DATA STORAGE AND POST CAPTURE CALL TRACE IN A COMMUNICATION NETWORK; Ser. No. 09/092,256, filed Jun. 5, 1998, entitled SYSTEM AND METHOD FOR GENERATING QUALITY OF SERVICE STATISTICS FOR AN INTERNATIONAL COMMUNICATION NETWORK; and Ser. No. 09/092,771, filed Jun. 5, 1998, which issued as U.S. Pat. No. 6,411,604 on Jun. 25, 2003, entitled SYSTEM AND METHOD FOR CORRELATING TRANSACTIONS MESSAGES IN A COMMUNICATION NETWORK, filed concurrently with this application and hereby incorporated by reference herein. These applications are commonly assigned.

TECHNICAL FIELD OF THE INVENTION

The present invention relates to calls and transactions in a communications network, such as an Signaling System Seven (SS7) network, and, more particularly, to monitoring transactions in an SS7 network to detect when a mass call condition exists for a particular destination telephone number.

BACKGROUND OF THE INVENTION

Common channel signaling networks, such as the Signaling System Seven (SS7) based signal system, use dedicated channels to pass digital messages between systems for call setup, call control, call routing, and other functions. These dedicated signaling channels are part of a network that is separate from the network that carries the actual voice and data signals. An SS7 network is a separate switching system which is used prior to, during, and at the end of an actual voice or data call. The SS7 network is used to route control information. Whenever two switches or elements have to pass call control information during or prior to a phone call, they pass this data via the SS7 signaling network.

There are three basic types of network node elements in an SS7 network. One of them is the Service Switching Point (SSP), which may be a central office switch, a tandem switch or an end office switch. A second principal node element is the Service Control Point (SCP). An SCP acts as a database query server for the rest of the network. An SCP is used in such applications as translating ported telephone numbers, routing 800 calls, tracking roamers in a cellular network, and Alternate Billing Service/Line Identification Database services (or ABS/LIDB) which provide operator-type services. The third principal node element is the Signal Transfer point (STP). An STP is essentially a packet switch that routes the messages from SSPs and SCPs to SSPs and SCPs.

It is possible to combine these three different types of nodes into a single node. However, in North America, they are typically not combined. An SSP performs only switch functions, an SCP only control functions, and an STP only signal transfer functions. In European telecommunications systems, all of these different functions may be combined into one node.

The SS7 network carries a great deal of information and is extremely critical to the operation of the phone system. If an SS7 network is not functioning, or if portions of it are not operating, the phone system simply cannot deliver phone calls, even though all of the voice circuits are operating properly. The capacity and complexity of the SS7 network is small in terms of circuitry and bandwidth utilized by an end user compared to previous voice and data networks. The circuitry of the SS7 network is therefore much more critical. The actual elements in the SS7 network do not provide all the information required in network operations to manage and to determine the health and state of an SS7 network. It is therefore necessary for the telephone industry to deploy surveillance equipment to monitor the links connecting the nodes of the SS7 network.

The topology of the network is such that STPs are typically deployed in a mated pair configuration at geographically separate locations. Connected to a mated pair of STPs will be a set of SSPs and SCPs. This conglomeration of SSPs, SCPs and mated Pair STPs is called a cluster. Clusters are then connected by D-Quad links between STP mated pairs.

When any transaction or message is sent between two different devices on the network, it is often the case that the messages going from switch A to switch B travel one route on the network while the messages going from switch B to switch A travel a different route. The network surveillance equipment that monitors the link is designed to capture and correlate as much signaling information as possible regardless of network activity. Because of the different data paths that messages may take, it is difficult to do this correlation above what is called the transport layer when monitoring links at the STP sites. An example of an application level problem would be where a subscriber has a problem getting his/her calls delivered. The telephone company may attempt to fix the problem by doing a trace of all data pertaining to that subscriber's phone number, but the data may not all be located at one point. The data may be all in one STP, or split in some fashion, partially in one STP and partially in the other STP of a mated pair, which may be in a different city many miles away.

In an SS7 network, each telephone is connected to a single end office, which may be an SSP or some other switch. The end office is connected to the SS7 network through one or more STPs. All calls that are directed to a particular destination telephone must pass through that telephone's assigned end office. Each end office has the capability to handle a finite number of calls. Under normal conditions, incoming calls and transactions to an end office are spread among a large number of telephones and destination telephone numbers. However, in some situations, a large volume of calls may be directed to a particular destination telephone number. If the incoming call volume exceeds the capabilities of the end office, then the switch will not be able to completed some of the calls and they will be dropped.

If a particular telephone number is used by an unusually high number of callers, then a mass call condition may arise. In a mass call condition the end office is not able to complete all of the incoming calls of the high volume of calls to a particular telephone number. As a result, calls to one telephone detrimentally affect the calls to all telephones connected to the same switch.

It is an object of the present invention to detect when a mass call condition exists and to minimize the effect of the mass call condition on calls to the mass called number and to other telephone numbers.

It is a further object of the present invention to correlate transaction signaling units in an SS7 network into transaction records and to use the transaction records to detect information about highly called telephone numbers that are affected by the mass call condition.

SUMMARY OF THE INVENTION

These and other objects, features and technical advantages are achieved by a system and method in which monitoring units non-intrusively capture transaction signaling units or messages from links in a communications network. The transaction signaling units are correlated in transaction processors. All transaction messages that are related to one transaction are combined into a single transaction record. The transaction records are provided to a processor or state machine which monitors the call load for each destination telephone number.

Monitoring systems that continually monitor, in real time, all calls on a signaling network are disclosed in U.S. Pat. No. 5,592,530, entitled TELEPHONE SWITCH DUAL MONITORS; and in application Ser. No. 09/057,940, filed Apr. 4, 1998, entitled SYSTEM AND METHOD FOR MONITORING PERFORMANCE STATISTICS IN A COMMUNICATIONS NETWORK, the disclosure of which is hereby incorporated by reference herein.

Each monitoring unit processes transaction records to detect mass call onset conditions. A continually updated list of recently detected destination telephone numbers is maintained by a processor on the monitoring unit. If the number of calls to a destination telephone number exceeds a short-term threshold, then the detecting monitoring unit instructs other monitoring units to track the destination telephone number. If the number of calls to the destination telephone number then exceeds a long-term threshold, then a mass call alarm is generated.

When a mass call alarm is generated, the user or network service provider receives certain preselected data. The user may receive point codes for the destination that is receiving the mass call event and for the nodes that are originating the calls to the affected telephone number. Also, the system may provide a telephone number, or a range of telephone number digits, such as an area code or an exchange, that is receiving an abnormally high volume of calls. Alarms and information can also be generated for types of failed call release causes, such as dialed number busy.

It is a feature of the present invention to correlate all transaction messages in a communications network into transaction records representing each transaction over the network. The transactions are detected and correlated using an inter-linked group of monitoring devices.

It is an additional feature of the present invention to monitor destination telephone numbers in said transaction records. A list of most recently detected destination telephone numbers is maintained. For example, the list may comprise the destination telephone numbers detected in a selected period, such as numbers called in the last five seconds. The list of recently called telephone numbers also tracks the number of calls to each destination number within the period. The destination number list is filtered to detect if the number of calls to any of the destinations exceeds a first threshold.

It is another feature of the present invention to provide a destination number that exceeds the first threshold to other monitoring units. All of the monitoring units then detect and forward any relevant transaction records that have the same called number to a central or master mass call monitoring unit. If calls to the destination number exceed a second threshold, then a mass call alarm is generated to warn the service provider or user.

It is further feature of the present invention allow users to select various types of data that is to be provided when a mass call alarm is generated. The data comprises information about the called and calling numbers and point codes. Furthermore, the user can select other information to be provided, such as reasons for call failures or types of release causes.

The present invention provides the user with real-time mass call onset detection on a per phone number basis. The mass call application can be distributed across the network at each monitor. The transaction processors described herein allow for a system in which multiple inbound and outbound messages are correlated into a single unified record per transaction.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
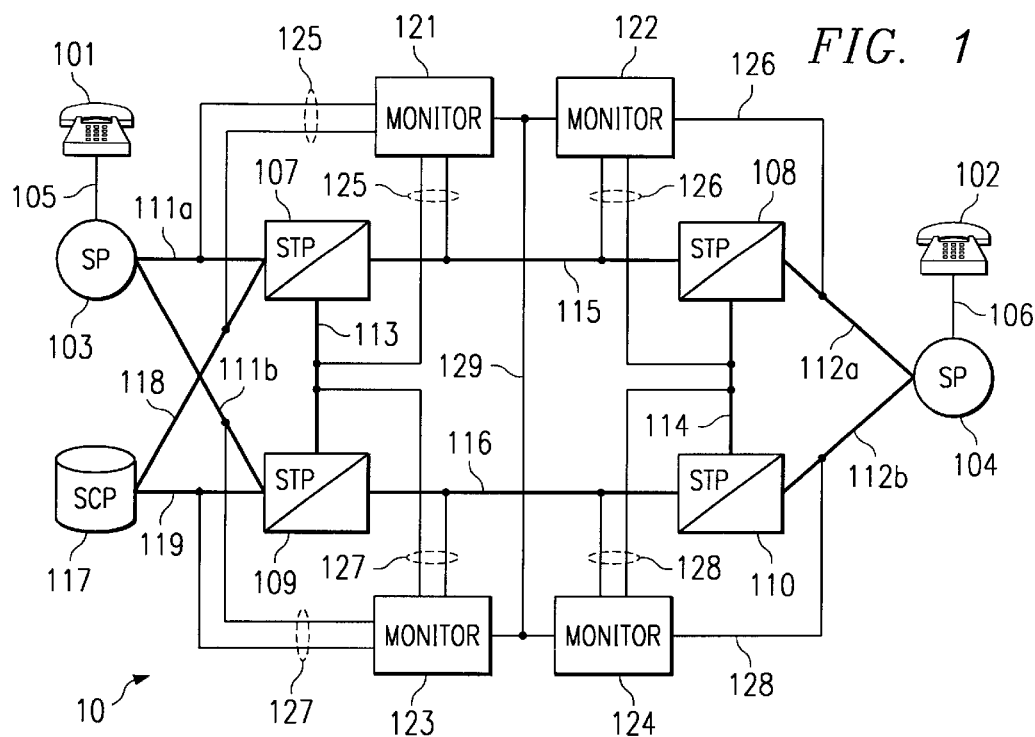
FIG. 1 is a high level block diagram of a network monitoring system coupled to a communication network.

FIG. 1 illustrates communications network 10 which may be a Signaling System Seven (SS7) network. Customers 101 and 102 are coupled to end offices 103 and 104 via telephone lines 105 and 106. End offices 103 and 104, which may be Signaling Points (SPs) or Service Switching Points (SSPs), are coupled to STPs 107–110 via trunks 111 and 112, which are known as A-links in an SS7 system. Typically, STPs 107–110 are arranged in a mated pair configuration wherein C-Links, such as trunks 113 and 114, link mated pairs 107 and 109 or 108 and 110 respectively. The mated pairs are linked via B-links, such as trunks 115 and 116.

Other components may also be coupled to network 10, such as a Service Node (SN), an Intelligent Peripheral (IP) or a Service Control Point (SCP). SCP 117 is coupled to STPs 107 and 109 via links 118 and 119. SCP 117 may be used in network 10 to provide database services for applications such as 800, CLASS, Local Number Portability (LNP).

Calls and transactions between end offices 103 and 104 are routed via STPs 107–110 via links 111–116. Signaling units traveling between end office 103 and 104 may take any number of paths through network 10. Typically, signaling units traveling in one direction from end office 103 to 104 will follow the same path for one transaction or call. However, signaling units traveling in the opposite direction, from end office 104 to 103, may take a different path for the same transaction or call. For example, if user 101 initiates a call to user 102, a Transaction Capabilities Application Part (TCAP) BEGIN message may be routed from end office 103 to end office 104 via STPs 107 and 108 across links 111a, 115, and 112a. In response, a TCAP response message, such as a CONTINUE or an END message, may be routed from end office 104 to end office 103 via STPs 110 and 109 across links 112b, 116, and 111b. Generally, successive messages corresponding a single transaction will travel from end office 103 to end office 104 through STPs 107 and 108, while messages traveling in the opposite direction will pass through STPs 109 and 110.

In the present invention, network monitors 121–124 capture substantially all of the signaling units traveling through network 10. Each monitor, 121–124, is non-intrusively coupled, via connections 125–128, to all links associated with a particular STP 107–110. For example, monitor 121 is associated with STP 107 and captures all messages traveling across links 113, 115, 118 and 119. Similarly, monitors 122–124 monitor the messages passing through STPs 108–110 via links 126–128.

Although two monitors may simultaneously monitor the signaling units and messages on a single link, no monitor is coupled to all of the links in network 10. For example, monitors 121 and 122 both detect messages on link 115. However, the other monitors, 123 and 124, are not coupled to link 115 and, therefore, will not detect any of the messages on link 115.

Monitors 121 to 124 are coupled to each other via inter-monitor communication bus 129. Bus 129 may be part of a data network, such as a Wide Area Network (WAN). Monitors 121–124 may also be linked to a central server or user workstations, as disclosed in application Ser. No. 09/093,824, filed on Jun. 8, 1998, which issued as U.S. Pat. No. 6,249,572 on Jun. 19, 2001 and 09/094,122, filed Jun. 9, 1998, the disclosure of which is hereby incorporated by reference herein.

Figure 2:
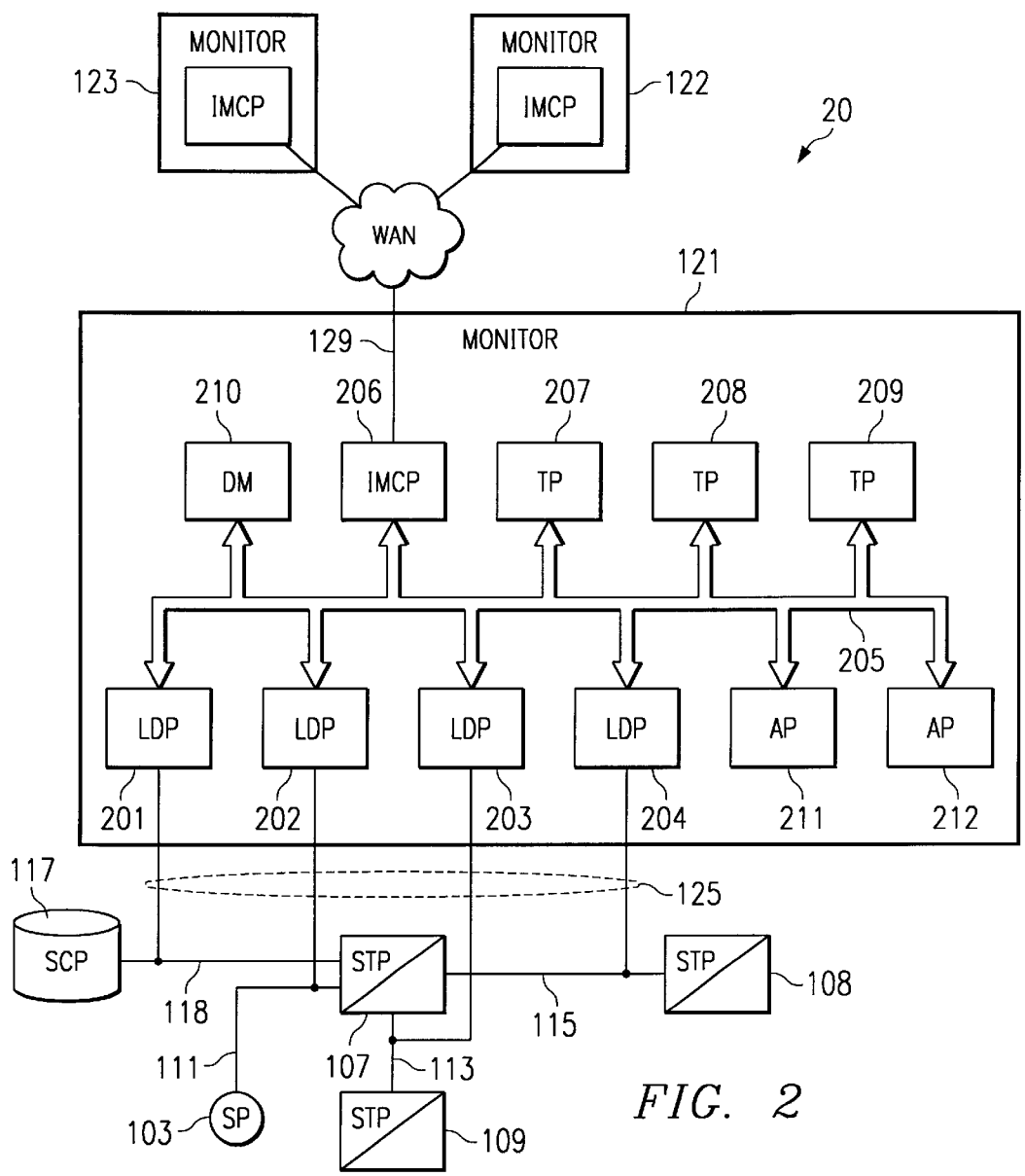
FIG. 2 is a block diagram of a network monitoring device.

Turning now to FIG. 2, in which like elements are similarly numbered, system 20 is a block diagram of the components of monitor 121. Link Distribution Processors (LDPs) 201–204 are coupled to the components and links in network 10, via links 125. LDPs 201–204 receive the messages and signaling units that are detected on links 111, 113, 115 and 118. Signaling units from LDPs 201–204 can be routed to Inter-Monitor Communications Processor (IMCP) 206 or Transaction Processors (TPs) 207–209. Distribution Manager (DM) 210 controls the routing of signaling units between LDPs 201–204, TPs 207–209 and IMCP 206. IMCP 206 is in communications with other monitors, such as monitors 122 and 123 as shown, via inter-monitor bus 129.

Although FIG. 2 illustrates transaction processors, it will be understood that in a preferred embodiment, monitor 20 is capable of processing circuit related messages and network management related messages in other processors. Application processors (AP) 211 and 212 are also linked to bus 205. APs 211 and 212 provide additional processing for signaling units and transaction records in monitor 121. Furthermore, although monitor 121 is used as an example, it will be understood that other monitors in the network, such as 122–124, operate in a similar manner.

In operation, monitor 121 receives signaling units from links 111, 113, 115, and 118 via links 125. LDPs 201–204 receive the captured signaling units and route them to TPs 207–209 under the direction of DM 210.

Figure 3A:
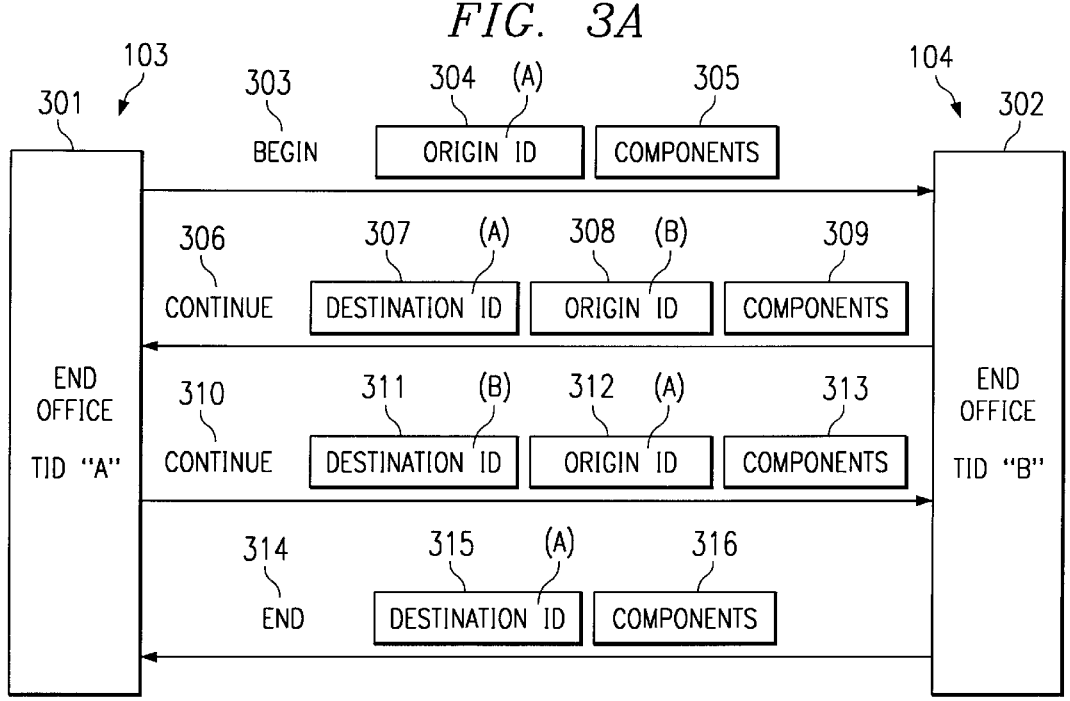
FIG. 3A illustrates a series of messages exchanged between end offices in a communications network.

FIG. 3A illustrates a series of signaling units that are exchanged between end offices 301 and 302 for a particular transaction. Intermediate network elements, such as STPs, are not shown in FIG. 3A. It will be understood that in a telecommunications network, such as in an SS7 network, messages may also be exchanged between other network components, such as between STPs and SCPs. The transaction in FIG. 3 starts with BEGIN message 303, which originates at end office 301. The BEGIN message used herein, as well as the CONTINUE and END messages, is a generic message that is used to represent many types of SS7 transaction messages. For example, a BEGIN message may be a TCAP query, a CONTINUATION message may be a continue or conversation message, and an END message may be an abort or response message.

BEGIN message 303 is an initial message for a transaction. Message 303 includes Transaction Identifier (TID) 304. For the life of the transaction, end office 301 will use TID 304 as the unique identifier for the transaction. Other concurrent transactions will use be assigned a different TID. However, once the transaction shown in FIG. 3A is complete, end office 301 may reuse TID 304. In a BEGIN message, TID 304 identifies the originating network element. In FIG. 3, TID 304 is "A" or the identifier generated by end office 301. Each TID is an unique 32-bit number that is randomly generated by the initiating network element. The TID has significance for one series of messages representing one complete transaction. BEGIN message 303 also has other components 305, which vary depending upon the specific type of transaction.

End office 302 receives BEGIN message 303 and responds with CONTINUE message 306. CONTINUE message 306 comprises TID's 307 and 308 and message components 309. TID 307 represents the destination identifier, which in this case is "A" for end office 301. Originating TID 308 is "B" which has been assigned by end office 302, the originating element for CONTINUE message 306. In FIG. 3A, end office 301 responds to CONTINUE message 306 with CONTINUE message 310, which also comprises destination and origination TIDs 311 and 312 and components 309. Destination TID is "B" for end office 302 and the originating TID is "A" for end office 301. END message 314 is sent by end office 302 at the completion of the transaction. Message 314 comprises destination TID "A" and components 316. END message 314 does not need the originating TID "B" because this is the last message in the transaction and end office 301 will not respond to END message 314.

Figure 3B:
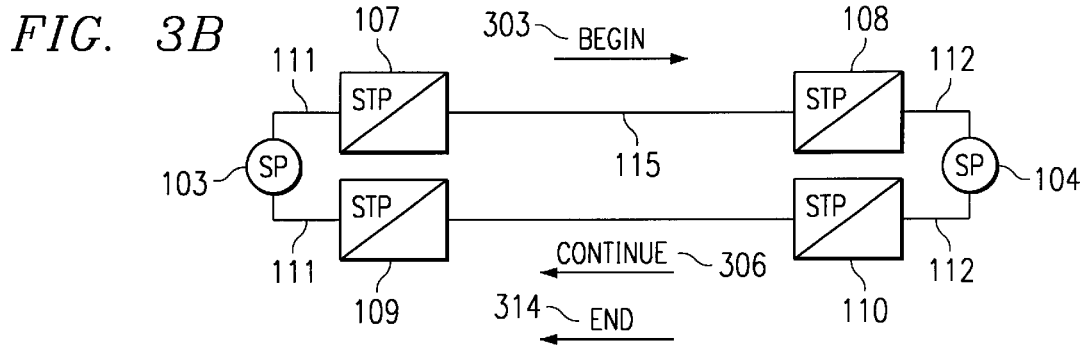
FIG. 3B is a block diagram illustrating messages exchanged over separate links in a communications network.

FIG. 3B illustrates how the BEGIN, CONTINUE and END messages may flow through communications network 10. For example, when end office 103 initiates the transaction, BEGIN message 303 may pass through STPs 107 and 108 to end office 104. In response, end office 104 initiates CONTINUE message 306, which may traverse a different path through network 10 in route to end office 103. For example, CONTINUE message 306 may pass through STPs 110 and 109.

In this case, network monitors 121 and 122 will detect BEGIN message 303 and monitors 124 and 123 will detect CONTINUE message 306. Typically, a series of related messages that are initiated at the same end office or other network element will follow the same path for the same destination. In this case, CONTINUE message 310 also traverses through STPs 107 and 108 in route to end office 104 and END message 314 traverses STPs 110 and 109. As a result, monitors 121–124 will not detect the entire series of messages for this transaction.

With reference to monitor 121 as shown in FIG. 2, LDPs 202 and 204 detect BEGIN message 303 and CONTINUE message 310 as these signaling units traverse links 111 and 115. However, monitor 121 does not detect CONTINUE message 306 or END message 314. BEGIN message 303, starts in end office 103 and passes over A-link 111 where it is first detected by monitor 121. LDP 202 receives the signaling units from Link 111. These signaling units are sent from LDP 202 to transaction processors 207–209 under the control of Distribution Manager 210. DM 210 continually monitors the processing load on TPs 207–209 and maintains track of which TIDs are assigned to each TP 207–209. For newly detected TIDs that are not assigned to one of the TPs, DM 210 assigns the signaling unit to one of the TPs based upon the TP processing loads. One of the main keys to correlating messages in the present invention is the designation of a specific transaction processor on a specific monitor as the controlling, or anchor, monitor for that transaction. The anchor monitor/transaction processor tracks all signaling units for the assigned transactions.

LDPs 201 to 204 comprise a cache memory (not shown) which holds a table of TIDs mapped to assigned TPs. This table is continually updated. If LDPs 201 to 204 detect a signaling unit with a TID that has already been assigned, then that signaling unit will be sent to the appropriate TP. LDPs can directly route signaling units from LDP 201 to 204 to TPs 207 to 209 if LDPs 201 to 204 have a specific TID already stored locally in the cache. LDPs 201–204 first look to the local cache to determine whether the TID for a new signaling unit has been assigned to a specific TP. If LDPs 201 to 204 do not have that TID assigned locally, a query is sent to DM 210 requesting an assignment to a specific TP for the new TID. LDPs 201 and 204 update the local cache tables when they receive instructions from DM 210 as to which TP the new signaling unit should be sent. Thereafter, future signaling units having that same TID will be sent directly from the LDP to the TP without having to query DM 210.

As discussed above, continue messages will contain both an originating and a destination TID. LDPs 201–204 must select the correct TID to ensure that the message is sent to the correct TP for processing. For example, when monitor 121 receives BEGIN message 303, LDP 202 will query DM 210 requesting an assignment for TID "A". Once BEGIN message 303 is sent to a particular TP, such as 207, for processing, then all later detected messages having the same TID "A" will be routed to the same TP, 207.

TPs 207–209 receive signaling units from LDPs 201–204, from other monitors via IMCP 206 and network 129, or from other TPs 207–209 on monitor 121. TPs 207–209 have the capability of moving signaling units among the various processors in order to route the messages to the proper TP for a particular TID. TPs 207–209 may also send signaling units to other monitoring units. Initially, system 20 may select the wrong TID and, as a result, route the signaling unit to the wrong TP for processing. Therefore, system 20 must allow TPs 207–209 to forward a mis-routed signaling unit to the proper TP.

For example, in FIG. 3A, TID "A" 304 is used to assign BEGIN message 303 to a TP, such as 207, for processing. System 20 uses the second TID in CONTINUE messages to route the messages to the proper TPs 207–209. In CONTINUE message 306, the second TID is "B" 308, which, if used for assigning message 306 to a TP, may cause message 306 to be routed the wrong TP, such as 208 instead of 207. TPs 207–209 have the capability to recognize when a message has been mis-routed and they can then re-route the message using the other TID in the message. In the example above, TP 208 would determine that CONTINUE message 306 has been mis-routed and it would forward CONTINUE message 306 to TP 207 using TID "A" 307.

IMCP 206 follows a similar procedure for selecting which TID to use when assigning messages that are received via inter-monitor network 129. IMCP 206 also maintains a local cache comprising a table of TIDs mapped to specific assigned TPs. For TIDs that are not in the table on the IMCP cache, IMCP 206 queries DM 210 to determine which TP should receive the forwarded signaling unit.

Figure 4:
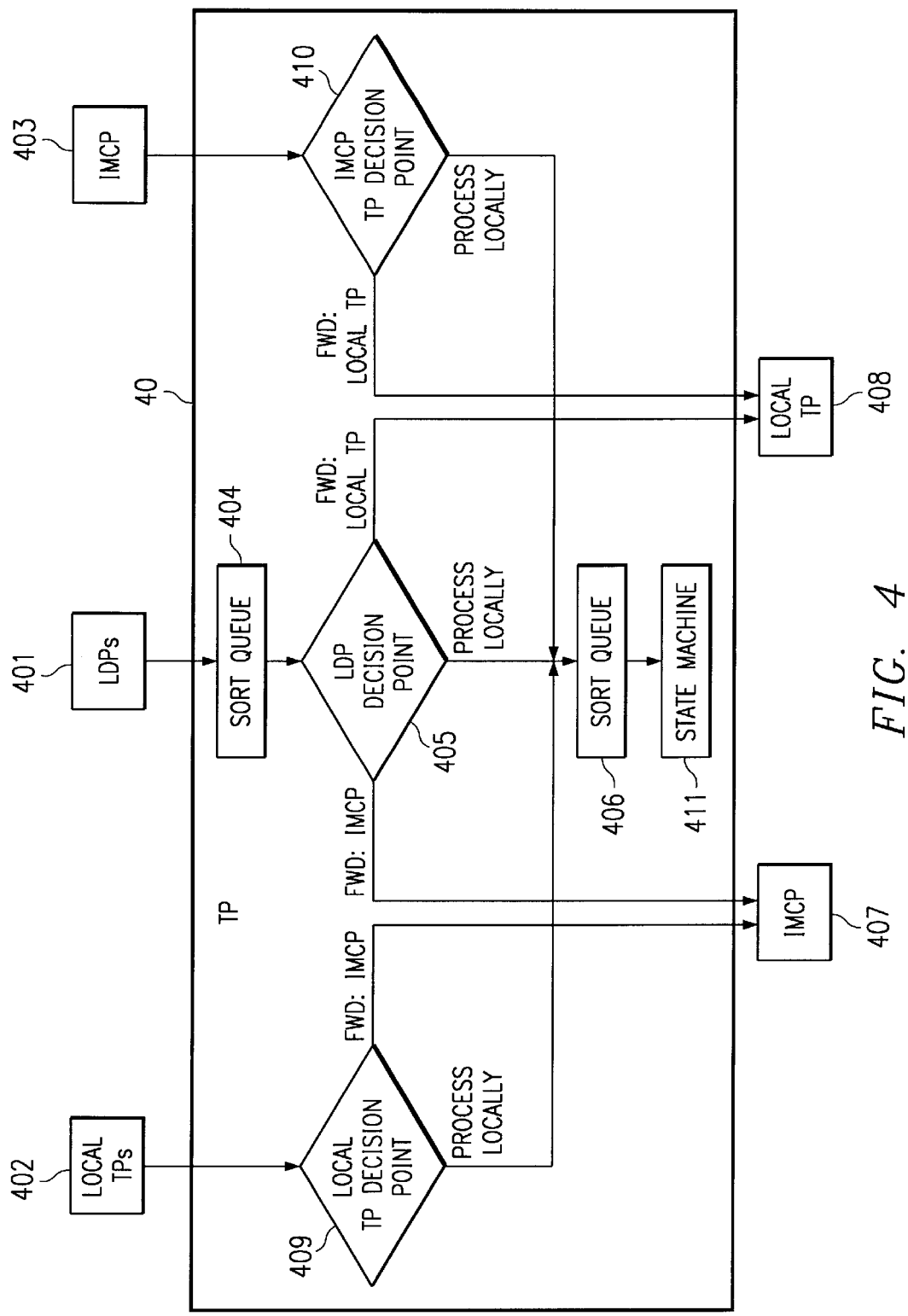
FIG. 4 is a flow chart illustrating the movement of signaling units in a transaction processor of the present invention.

FIG. 4 illustrates the logical operation of a transaction processor 40, such as TP 207. Signaling units may be received from LDPs 401 or from other local TPs 402, such as TPs 208 and 209, via local bus 205. Additionally, TP 40 may receive signaling units from other monitoring devices, such as monitors 122–124. IMCP receiver 403 receives signaling units that are forwarded from other monitors over network 129. These signaling units are then routed via internal bus 205 to assigned TP 40. Transaction Processor 40 processes each signaling unit using an algorithm that is associated with the source of the signaling unit. Accordingly, signaling units that are received from LDPs 401, local TPs 402 and IMCP 403 are all processed in a slightly different manner.

With respect to signaling units that are received from LDPs 401, TP 40 sorts the signaling unit in sort queue 404. Two criteria are used in sort queue 404. First, the signaling units are time sorted based upon a time stamp that is assigned to each signaling unit by the detecting LDP 201–204. Each LDP time stamps the captured signaling units before transmitting the signaling units to TPs 207–209. Sort queue 404 time sorts all of the received messages so that they are in order of time of detection. This compensates for delays on bus 205 and links 125 and ensures that TP 40 processes the signaling units in a chronological order.

The second sort criteria for queue 404 is inbound and outbound matching. As illustrated in FIG. 2, signaling units traveling from SP103 to STP 108 will traverse links 111 and 115. Accordingly, monitor 20 will detect the same signaling unit two times. LDP 202 will detect the signaling unit traversing link 111 and LDP 204 will detect the signaling unit as it traverses link 115. Each time the signaling unit is detected, it receives a separate time stamp from LDPs 202 and 204. TP 40 arranges the signal units in the proper time order and then matches inbound and outbound signaling units that correspond to one message.

For example, BEGIN message 303 will be detected on link 111 and transmitted to a TP by LDP 202. Message 303 will also detected on link 115 by LDP 204. TP 40 determines that these are the same BEGIN messages, having the same TID "A" for originating SP 103. Accordingly, these two detections of BEGIN message 303 are correlated in queue 404 into a single BEGIN message for processing. This prevents the messages from being processed twice within TP 40.

Since the monitors used in the present invention capture signaling units from all links associated with the network elements, each message will be seen on both the inbound and outbound side of the network nodes. Accordingly, all messages traversing a network element must be correlated for both inbound and outbound detections. TP 40 uses the TID and the originating and destination point codes of the messages for inbound/outbound matching. When the inbound and outbound messages are correlated, any changes that occur in the network node, such as Global Title Translation (GTT), are kept with the message. After sorting and matching the signaling units in queue 404, TP 40 then processes each message at LDP decision point 405.

Figures 5, 6:
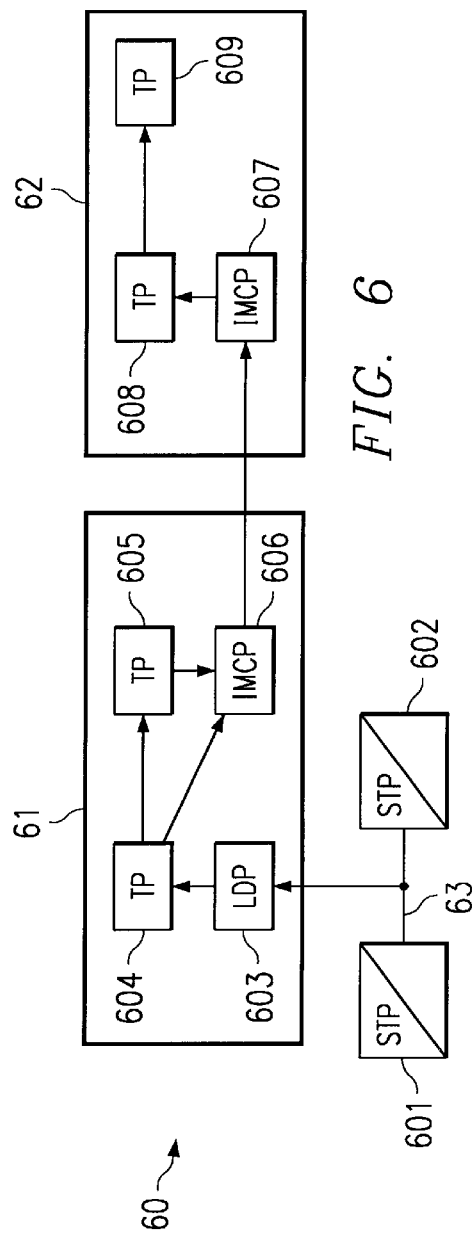
FIG. 5 is a table used by the transaction processor shown in FIG. 4.
FIG. 6 is a simplified block diagram of the transaction processing system described herein.

Transaction table 50 in FIG. 5 is used to track each transaction signaling unit that is processed in TP 40. Each transaction has a unique TID and a point code. These parameters are used as the key or index 51, 52 for transaction table 50. Each entry 59 in table 50 represents a separate transaction. The transactions are assigned variables 53–58.

The Type variable, 53, is either long termed or short termed. Generally, signaling units corresponding to this transaction will be forwarded to another TP. Any transaction processor on a non-anchor monitor is always short termed. Any anchor transaction processor on an anchor monitor is always long term. A non-anchor transaction processor on an anchor monitor will eventually be promoted to long term by the anchor monitor so that messages will be forwarded to the anchor processor. The short term period is less than or equal to the period during which a TID cannot be reused. Long term transaction records are maintained until the transaction is complete, such as when an END message has been detected. In the preferred embodiment, users can configure the how long the short term transactions will be maintained in Table 50. If no other message for a short term transaction is detected within the selected time period, then the transaction record is erased from Table 50.

As discussed with respect to FIG. 3A, transaction signaling units may contain both an origination and destination TID. Additionally, the signaling units typically contain an origination point code (OPC) and/or a destination point code (DPC). In the preferred embodiment, transactions in table 50 are keyed according to the origination point code 51 and originating TID 52. The other point code 54, such as the destination point code, and the other TID 55, such as the destination TID are maintained in the transaction record for each signaling unit. Some messages, such as END messages, do not have originating TIDs. These messages are keyed using the destination TID. It will be understood, with respect to Table 50, that any point code or TID can be used either as a key or index parameter or as an alternate parameter.

Each transaction in table 50 is assigned specific processing instructions 56. Processing instruction variable 56 is used by TP 40 to determine whether signaling units for a transaction should be processed locally, or whether the messages should be sent to another processor. There are several types of processing instructions, including: Process Locally, Forward Local TP, and Forward IMCP. The Process Locally instruction is assigned for transactions that are assigned to this transaction processor 40. TP 40 is referred to as the anchor or controlling monitor for these transactions. The Process Locally instruction may be assigned when TP 40 is responsible for the primary or secondary processing of a transaction, although it is not the anchor. The Forward Local TP instruction is used to route signaling units to another TP that is located on the same monitor. For example, if TP 207 is the primary processor for a particular transaction, when TP 208 detects signaling units for that transaction, TP 208 will forward the signaling unit to local TP 207 for processing. The Forward IMCP instruction is used to route signaling units to another TP on a remote monitor via network 129 which is the anchor or primary processor for a particular transaction.

Signaling units are processed in LDP decision point 405 according to the message type. For example, BEGIN messages will be processed using a different algorithm than CONTINUE or END messages. BEGIN messages are received by LDPs 401 from the network links. LDPs 401 forward the BEGIN signaling units to a particular TP 40 as assigned by DM 210. Typically, this assignment is based upon TP processing loads. The BEGIN message passes through sort queue 404 to LDP decision point 405. TP 40 assumes that it has been assigned responsibility for processing transactions corresponding to the BEGIN message and creates an entry in Table 50. Key point code 51 is the OPC and key TID 52 is the originating TID in the BEGIN message. Message type 53 is set to long termed and processing instruction 56 is set to Process Locally since TP 40 is the controlling processor for any subsequent transaction messages having the same Key TID 52. There is no alternate point code 54 or alternate TID 55 for the BEGIN message and the temporary end 57 and alternate set 58 parameters are not used at this time. The BEGIN message is sent from LDP decision point 405 to second sort queue 406 for further processing, which will be discussed below.

CONTINUE messages may be assigned to TP 40 because TP 40 has been assigned as the controlling processor for that transaction. Alternatively, if the CONTINUE message corresponds to a new transaction, DM 210 may assign the CONTINUE message and corresponding transaction to TP 40 based upon processor loading or other factors. LDP decision point 405 initially uses the originating TID and originating OPC in the CONTINUE message to determine whether a corresponding entry exists on Table 50.

If no record is found, then TP 40 creates a record on Table 50 and configures the record by setting Key Point Code 51 to the OPC and by setting Key TID 52 to the originating TID. Type 53 is set to short termed. Alternate Point Code 54 and Alternate TID 55 are set to the DPC and destination TID, respectively. Instruction 56 is set to Forward Local TP. The reason for using the Forward Local TP instruction is that this CONTINUE message was routed to TP 40 from LDPs 401 using the origination TID and, since no record currently existed, TP 40 was not already processing this transaction. Since DM 210 did not forward the CONTINUE message to IMPC 206, TP 40 assumes that the CONTINUE message should be processed on the local monitor, but on a different TP. Accordingly, TP 40 forwards the CONTINUE message to another TP on the same monitor. However, when the CONTINUE message is forwarded in this situation, the alternative TID, here the destination TID, is used to route the CONTINUE message. TP 40 queries the DM 210, using the alternative TID, to determine the appropriate transaction processor that should receive the CONTINUE message.

If an entry is found in Table 50 using the OPC or origination TID, then TP 40 will follow instructions 56 for that entry in Table 50. The instructions may be Locally Process, in which case the CONTINUE message is forwarded to sort queue 406 to be processed locally at TP 40.

Alternatively, instructions 56 may Forward Local TP or Forward IMCP, and TP 40 will forward the signaling unit to IMCP 407 or Local TP 408. Since a message has been detected for an entry in Table 50 within the selected short term time period, the short termed timer is reset to zero since additional messages for that transaction may be detected.

When END messages are received from LDPs 401, TP 40 determines whether the DPC and destination TID are in Table 50. If they are not found, TP 40 assumes that the proper instruction is Forward IMCP and the END message is forwarded to IMCP 407. Additionally, a new record is created in Table 50 for the END message. The instruction 56 for this record is an End Pending instruction, which will be discussed below. The record is keyed 51, 52 with the DPC and the destination TID and the type 53 is short termed. Therefore, the record will be deleted if no other message is detected for this transaction within the preconfigured time period. The END will be held by TP 40 and it will not be processed or forwarded until another message for the same transaction is detected.

If the DPC and TID for the END are found in Table 50, then TP 40 follows instructions 56. If the instruction is Process Locally, then the end message is forwarded to sort queue 406 on TP 40. Alternatively, the END message will be forwarded to IMCP 407 or to Local TP 408 as directed by instruction 56.

TP 40 receives signaling units from other local TPs 402 and from IMCP 403. IMCPs 403 and 407 may be different devices or they be the same device, in which IMCP 403 represents a receive portion and LMCP 407 represents a transmit portion of the inter-monitor network interface. Signaling units or messages that are received by TP 40 from IMCP 403 are processed using the logic in IMCP decision point 410.

When a BEGIN message is received at IMCP decision point 410, an error condition is created and the BEGIN message is ignored. This is because all BEGIN messages should be routed from an LDP directly to a local TP. Then the TP, as discussed above, creates a new record and processes the BEGIN transaction locally. Accordingly, BEGIN messages should not be forwarded from the TP that is initially assigned the message.

When CONTINUE messages are received at IMCP decision point 410, TP 40 looks to Table 50 using the OPC and origination TID. If a transaction record is found, then TP 40 follows the appropriate instructions 56. If instruction 56 is Process Locally, TP 40 will forward the signaling unit to sort queue 406. If instruction 56 is Forward Local TP, TP 40 will forward the CONTINUE message to a local TP 408 on the same monitoring unit.

If instruction 56 is Forward IMCP, this creates an error condition at IMCP decision point 410, because TP 40 has just received the CONTINUE message from IMCP 403. Since the signaling unit has already traversed the IMCP, TP 40 will not forward the message back to IMCP 407. As a result, the CONTINUE message will be ignored.

If instruction 56 is End Pending, then TP 40 assumes that the instruction for the CONTINUE message is Forward Local TP. Accordingly, TP 40 forwards the CONTINUE message to the appropriate local TP 408. TP 40 also forwards the pending END message, which has been temporarily held as described above. This results in two messages being sent to local TP 408, both the CONTINUE and the held up END message. The messages are forwarded using the DPC and destination TID of the CONTINUE message.

If the CONTINUE message is not found in Table 50, then IMCP decision point 410 proceeds in the same manner as LDP decision point 405 for a CONTINUE message that is not found in Table 50. TP 40 creates a new record in Table 50 and sets Key Point Code 51 to the OPC and Key TID 52 to the origination TID. Record type 53 is set to short termed and Alternate Point Code 54 and Alternate TID 55 are set to the DCP and the destination TID, respectively. Instruction 56 is set to Forward Local TP. The CONTINUE message is then forwarded to local TP 408 from IMCP decision point 409.

When an END message is received at IMCP decision point 410, TP 40 looks-up the DPC and destination TID in Table 50. If no corresponding record is found, then an error condition is created and TP 40 ignores the END message. On the other hand, if there is an entry for that point code and destination TID in Table 50, then TP 40 follows instructions 56. For a Process Locally instruction, TP 40 sends the END message to Sort Queue 406, and for a Forward Local TP instruction, TP 40 sends the END message to Local TP 408. However, if instruction 56 is Forward IMCP, this creates an error condition since the END message has already traversed network 129. TP 40 will not send a signaling unit back to IMCP 407 and network 129 a second time. Accordingly, the END is ignored. An End Pending instruction also creates an error condition because there should only be a single END message for each transaction. An End Pending instruction indicates that there another END message already exists for that transaction, as a result the second END message is ignored.

In addition to receiving signaling units from LDPs 401 and IMCP 403, TP 40 receives signaling units from other transaction processors on the same monitoring device. These signaling units are transferred among the TPs on local bus 205. As these messages are received by TP 40, they are processed at Local TP decision point 409. BEGIN messages should not appear at Local TP decision point for the same reasons discussed above with respect to IMCP decision point 410. Therefore, if a BEGIN message appears at Local TP decision point 409, it will create an error condition and the BEGIN message will be ignored.

When CONTINUE messages are received from Local TPs 402, TP 40 does a look-up on Table 50. At Local TP decision point 409, the Table 50 look-up uses the alternate point code and TID, the DPC and the destination TID. These parameters are used because it is assumed that the other point code and TID, the OPC and originating TID, were used at Local TP 402 and not found as discussed above with respect to LDP decision point 405 and IMCP decision point 410. Also, the CONTINUE message has been forwarded from Local TPs 402 using the DPC and the originating TID.

If the DPC and destination TID for the CONTINUE message are not found in Table 50, then TP 40 determines whether the signaling unit has already traversed network 129 and IMCP 403, 407. An error condition is created if the CONTINUE message has already traversed IMCP 403,407 before being forwarded from Local TPs 402 and the CONTINUE message is ignored. In a preferred embodiment, the monitoring system uses a tracking bit or bits on each signaling unit to indicate whether the signaling units have been passed via IMCP 206 or from Local TP 402. This allows the transaction processors to determine where the signaling unit has been in the system.

If a corresponding transaction record is not found in Table 50 and the CONTINUE message has not yet been passed over network 129, then a new record is created in Table 50. The record is keyed to the OPC and the origination TID. Type 53 is set to short termed and alternative point code 54 and alternative TID 55 are set to the DPC and destination TID, respectively. Instructions 56 is set to Forward IMCP since the message has already been forwarded among Local TPs 401.

If there is a corresponding transaction in Table 50, then TP 40 performs instructions 56. When a record in Table 50 is created, Alternate Set 58 is set to false initially. If instruction 56 is Process Locally, then TP 40 looks to Alternate Set 58 to determine whether it is set to true or false. If Alternate Set 58 is false, then a message will be sent to the forwarding TP, Local TP 402, to change the forwarding TP's Alternate Set to true and Type to long termed. Alternate Set 58 on TP 40's Table 50 is also set to true to indicate that the message has been sent to the forwarding TP. When Alternate Set is true, no message is sent to the forwarding TP. Alternate Set true indicates that the forwarding TP should use Alternate Point Code 54 and Alternate TID 55 to forward signaling units for that transaction record. Finally, the CONTINUE signaling unit is forwarded to sort queue 406 for local processing on TP 40.

If instruction 56 is forward IMCP, Local TP decision point 409 first determines whether the signaling unit has already traversed IMCP 407 and network 129. If this signally unit has previously traversed IMCP 407, then this creates an error condition and the message is ignored. On the other hand, if the message has not traversed IMCP 407, then the CONTINUE message is forwarded to IMCP 407 to be routed to another TP on another monitor.

If the instruction is Forward Local TP, this creates an error condition since the message has already traversed bus 205 when it was forwarded from Local TP 402. The signaling unit will not be forwarded among TPs twice within one monitor.

If a CONTINUE message first enters TP 40 from LDP 401 and is forwarded to another local TP because there is no entry in Table 50, then, when the same CONTINUE message returns to TP 40 from Local TP 402 and there is entry in Table 50 that is keyed to the DPC or destination TID, the message is ignored as an error condition.

If instruction 56 for the CONTINUE message is an End Pending instruction, then a look-up is done using the destination point code and TID for the message. If no record is found, then TP 40 determines whether the signaling unit has traversed IMCP 407. If the CONTINUE message has not traversed network 129 or IMCP 403, then it is forwarded to IMCP 407. If the CONTINUE message has already traversed network 129 or IMCP 403 prior to Local TP 402, then that creates an error condition and the signal unit is ignored.

If a transaction record is found in Table 50, then TP 40 follows instruction 56. A second End Pending instruction creates an error condition and the signaling unit is ignored. If instruction 56 is Forward TP, this also creates an error condition and the CONTINUE message is ignored. For a Forward IMCP instruction, TP 40 again determines whether the message has traversed IMCP 403, in which case there is an error condition and the signaling unit is ignored. Otherwise, the signaling unit is sent via IMCP 403 to another monitor. If instruction 56 it Process Locally, then the CONTINUE message is forwarded to sort queue 406.

FIG. 6 is a simplified block diagram of a monitoring system 60 having monitors 61 and 62. Monitor 61 captures signaling units on link 63 between STPs 601 and 602. It will be understood that link 63 may be any link between any network elements, such as STPs, SCPs, SSPs, etc. Signaling units on trunk 63 are detected by LDP 603. A distribution manager (not shown) controls which transaction processor should receive the signaling unit from LDP 603. In FIG. 6, the signaling unit is sent to TP 604 for processing.

TP 604 performs the operations discussed above for LDP decision point 405. The signaling unit may be processed locally on TP 604, or may be forwarded either to TP 605 or IMCP 606. indications processor 606, indicates where it was forwarded to transaction processor 605 locally. That transaction processor then performs the steps discussed above with respect to decision point 409, and either processes the signaling unit locally, or forwards it to inter-monitor communications processor 606.

If the signaling unit is sent to TP 605, it is processed as described above with respect to Local TP decision point 409. TP 605 can either process the signaling unit locally or forward it to IMCP 606. TP 605 cannot forward the signaling unit to another TP in monitor 61, since the message has already been forwarded locally once.

Signaling units that are sent to IMCP 606 are forwarded via an inter-monitor bus or data network, such as a WAN, to IMCP 607 on monitor 62. A distribution manager on monitor 62 (not shown) controls which TP 608, 609 receives the signaling unit from IMCP 607. When TP 608 receives a signaling unit from IMCP 607, it performs the operations described above for IMCP decision point 410. TP 608 may process the signaling unit locally or it 608 may forward the signaling unit to another TP 609 on monitor 62. TP 608 cannot forward the signaling unit to IMCP 607 since this signaling unit has already traversed IMCP 607 once.

If the signaling unit is forwarded to TP 609, it is processed as described above with respect to Local TP decision point 409. At this point, since the signaling unit has already traversed IMCP 607 and has already been transferred locally among TPs, the only option remaining for TP 609 is to process the signaling unit locally.

As illustrated in FIG. 6, the maximum number of transaction processors that can see the same signaling unit is four. This limit is set by the fact that a signaling unit can only be transferred once within a monitor, and can only be transferred once across the IMCP bus.

Turning again to FIG. 4, eventually a signaling unit will be sent to a transaction processor 40 which will have the instruction Process Locally. At that point, the signaling units (BEGIN, CONTINUE, and END types) are sent to sort queue 406. There are many signaling units related to many transactions coming into sort queue 406. However, after undergoing all of the processing discussed above, the end result is that if one of the signaling units for a particular transaction goes into sort queue 406, then all of the signaling units for that transaction are in sort queue 406. The system is configured so that all of the signaling units for one transaction all end up in the same sort queue 406. Two signaling units for one transaction cannot be sent to two different sort queues 406 on two different transaction processors 40.

Sort queue 406 performs a time sort of the signaling units that have been detected on various monitors. The monitors are synchronized and each signaling unit is time-stamped. Sort queue 406 compensates for the processing delays in the various monitors and transaction processors by sorting all of the signaling units into time order.

Following sort queue 406, the signaling units are sent to state machine 411. State machine 411 processes the signaling units for each transaction and creates a transaction record for each transaction. State machine 411 is programmable and it can be driven based off of op codes, component types, time out conditions and other parameters. The state machine can be designed to filter out and process certain types of transactions and data.

State machine 411 creates transaction records when ever a BEGIN message is detected. The signaling unit for the BEGIN message is added to the transaction record. When a CONTINUE is detected, state machine 411 finds the appropriate transaction record and adds the signaling unit for the CONTINUE message to the transaction record. When an END message is detected, state machine 411 stores the END message signaling unit to the appropriate transaction record and then either stores the transaction record or deletes the transaction record depending upon the system's configuration and the applications that operate on the transaction record data. Then end of a transaction may be determined from an END message. In some cases, there may be a prearranged end instead of an END message, as in the case of an Integrated Network Application Part (INAP) transaction there is no END message.

In a preferred embodiment, applications can access the transaction record data in real-time and process the transaction data based upon message type, component type, op codes, called number digits, calling number digits. Applications can be used to generate call detail records, to trace calls, or to generate network statistics. A separate state machine 411 or other processor, such as Application Processors 211 and 212, is used for each application. Accordingly, it will be understood that additional state machines (not shown) may be coupled to sort queue 406. Furthermore, sort queue 406 and state machine 411 may be coupled to a memory storage device for storing transaction records or application data.

Figure 7:
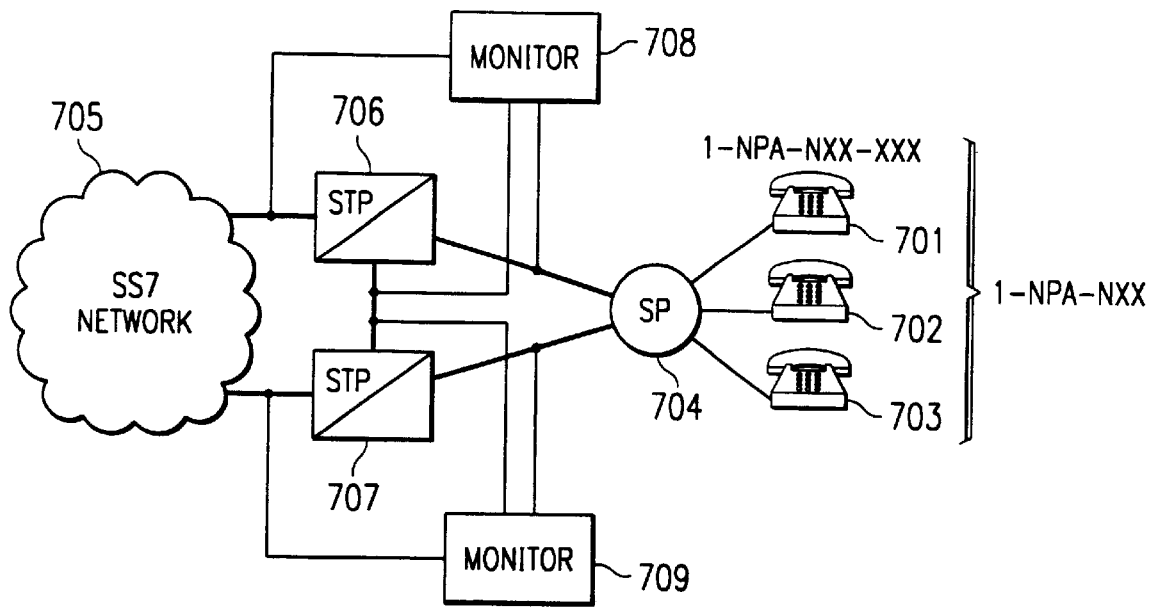
FIG. 7 is a block diagram of a portion of the network communication system of FIG. 1.

FIG. 7 illustrates a portion of an SS7 network wherein telephones 701–703 are connected via SP 704 to network 705 and STPs 706 and 707. Monitors 708 and 709 are coupled to the links for STPs 706 and 707. SP 704 is capable of handling a finite amount of message traffic. If too many calls or transactions are directed to a specific telephone 701 or group of telephones 701–703, then a busy condition at SP 704 may cause calls to telephone 701 and other telephones served by SP 704 to be lost. The monitoring system of the present invention can be used to detect a sudden increase in the number of calls or transactions for a particular switch, end office, telephone or group of telephones.

One example of a mass call onset condition is a call-in contest, such as may be run by a commercial radio station. These types of programs or events are well-known. Typically, as a promotional event, a radio station offers an award or prize to a particular caller, such as the first/second/third/etc. caller. The radio station uses a designated telephone number, such as NXX-XXXX or 1-NPA-NXX-XXXX, for the contest. Usually, many listeners dial the designated number within a short period of time, so as to be nearly simultaneous, in an attempt to be the winning caller. As a result, there is a sudden surge in calls to radio station telephone 701 and many of the calls must pass through end office 704. This increased call load may overload end office 704 causing calls to designated telephone 701 to fail and, in addition, causing calls to other telephones, 702 and 703, to also fail.

Other situations which may create a mass call condition are ticket brokers and catalog sales service centers. A ticket broker may announce that sales for a particular event, such as a concert, will be going on sale a predesignated time. When the predesignated time arrives, calls from potential ticket buyers may flood the ticket broker's telephone 701. Again, many of the calls will pass through SP 704, thereby overloading the capabilities of the end office and causing a mass call onset condition. Alternatively, a catalog sales service center may receive a significant increase in calls during a certain sale or during a particular period of time, for example, during the Christmas holiday period. As a result of the increased calls, SP 704 may be overloaded and some calls through that end office will fail.

It will be understood that calls to a single telephone, such as 701, are not the only source for mass call onset. Incoming calls may be directed to a number of related telephones, such as telephones 701–703, which may receive calls directed to the same destination. On the other hand, telephones 701–703 may be unrelated even though the incoming calls to those telephones, 701–703, combine to cause the mass call situation. Each individual telephone number for telephones 701–703 may actually receive a number of calls simultaneously if, for example, the telephone number is assigned to a Private Branch Exchange (PBX) or other multiple line telephone system.

In order to prevent a mass call onset condition from overloading an end office or SP, the present invention monitors substantially all of the transactions in the SS7 network and filters the transactions based on the called or destination telephone number. The system maintains a window of destination telephone numbers detected in a short time period and the number of calls directed to that destination telephone number. The system generates an alarm when it detects that the number of calls exceeds a preselected threshold.

Service providers can use the mass call onset detection to reduce the number of calls to the affected end office or STP. When the monitoring system generates an alarm, the service provider can direct the other network elements, such as the other end offices, SPs, SSPs, and STPs, not to send calls to the affected number or node. Alternatively, the service provider use "call gapping" by directing that a certain percentage of the calls that are directed to the mass-called number be dropped by the origination point or by the other network nodes. Since, the service provider does not want one destination telephone number to affect the switch's performance, dropped calls to the mass-called telephone number are generally acceptable in order to maintain service to the other telephone numbers served by the switch.

Figure 8:
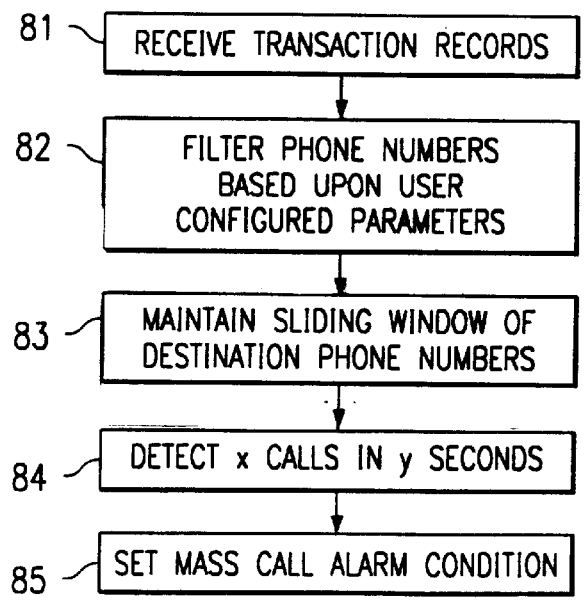
FIG. 8 is a flowchart illustrating the steps used to detect a mass call onset condition in the present invention.

FIG. 8 is a flowchart of the steps used by the present invention to detect a mass call situation. In step 81, a processor receives transaction records. In a preferred embodiment, the processor is on the monitor unit, 708, 709, such as APs 211 and 212 of FIG. 2. Alternatively, transaction processors, such as TPs 207–209, may execute the mass call detection program while generating the transaction records. A state machine embodiment may also be used to implement the mass call application. Mass call tracking may be performed concurrently by more than one processor on a monitor or by more than one monitor.

The list of destination telephone numbers are filtered according to user-configured parameters in step 82. The service provider, or monitoring system user, can configure the monitoring system to screen certain digits in the destination telephone numbers. Multiple profiles may be established for various telephone number combinations. The user may configure the system to watch all of the destination telephone numbers or only certain groups of them. Also, the system may be configured to track as many or as few digits in the destination number as the service provider desires. For example, the mass call detection system may filter all numbers directed to a "1-800" number, or all numbers directed to a particular area code or exchange (i.e. 1-NPA-NXX). In these cases, all transactions related to any telephone number having the designated area code/exchange combination will be counted against the same profile. In other cases, a profile may be used to detect mass call conditions for a specific telephone number (i.e. 1-NPA-NXX-XXXX). Each monitor 708 and 709 watches the destination telephone numbers passing through their respective STPs, 706, 707.

In step 83, the system maintains a sliding window of destination telephone numbers. This is a list of telephone numbers that have been part of the transaction records that are generated within a configurable period of time. For example, the window may contain all of the destination telephone numbers that have been detected in the last five seconds. These called numbers, or translated numbers, are extracted from the transaction record signaling units. Thousands of transactions, corresponding to thousands of destination telephone numbers, may be detected every second in STPs 706 and 707. By maintain a list of only the most recent destination numbers, the system is able to separate trivial from non-trivial numbers, as defined below.

The system has a detection threshold of X calls to a designated number within Y seconds. If the required number of calls are detected in step 84, then a mass call onset alarm is generated in step 85. Step 84 may have a single threshold or a two-step threshold. For a two-step threshold, once a preliminary "short-term" level is detected for a certain destination telephone number, then the system continues to watch that certain telephone number over a longer period to determine if the number of calls passes a "long-term" threshold. Numbers that do not pass the long term threshold are trivial and are discarded.

Monitors 708 and 709 operate independently of each other for the preliminary or short-term mass call detection. Once a destination number passes the preliminary threshold, then the detecting monitor exchanges data over inter-monitor link 129 instructing other monitors to watch a certain destination telephone number for mass call onset. After a telephone number passes the short-term threshold, then one of the monitors is designated as the master for that destination telephone number.

For example, calls to telephone number 1-NPA-NXX-XXXX may cause a mass call condition in SP 704. Generally, monitors 708 and 709 will both see transactions directed to that destination telephone number. Eventually, one of the monitors, such as monitor 708, will determine that the short-term threshold is met. Then monitor 708 instructs monitor 709 to watch for destination telephone number 1-NPA-NXX-XXXX. Monitor 708 may act as a master for the mass call onset detection for this number, in which case, monitor 709 will forward, to monitor 708, information on all future detections of 1-NPA-NXX-XXXX as a destination.

After the mass call alarm is generated in step 85, selected information is provided to the user. This information may comprise: the destination point code, DPC, for the STP, SSP, SP or switch that is receiving the mass call event; the telephone number receiving a high volume of calls; the dialed number, such as an "800" number; and the originating point codes, OPCs, that are generating calls to the affected telephone number. Additionally, the system may track the volume of calls per OPC, and other statistics. In the preferred embodiment, the information that is tracked by the system is configurable by the user.

The mass call condition is not limited to telephone numbers and end offices. The same system can be used to detect mass call or mass transaction onset though a particular STP or other network node. This would allow the user to determine if a particular STP or node is being overused, thereby reducing the bandwidth of the communications network.

It will be understood that mass call detection is possible in other types of networks using the same techniques described herein. For example, in a wireless communication network complying with the *Global System for Mobile Communications* (GSM) standard, SCCP messages can used to detect mass call conditions on the A-interface.

Furthermore, it will be understood that the present invention may be used to monitor high levels of message traffic directed to any network node. For example, the monitoring units may be used to detect the number of messages that are directed to a particular STP, SCP or other network element. Profiles could be configured by the user to specify the DPC for the relevant network nodes and transactions, calls or other messages routed to that node may be tracked. In a communications network employing Local Number Portability (LNP), for example, the monitoring system disclosed herein may be used to detect the onset of high levels of message traffic to a SCP for ported number queries. The high levels of messages traffic directed to a particular network node creates a mass transaction onset condition.

Although the present invention and its advantages have been described in detail, it should be understood that various changes, substitutions and alterations can be made herein without departing from the spirit and scope of the invention as defined by the appended claims.

What is claimed is:

1. A method for monitoring message traffic levels in a communications network having a plurality of nodes, said network nodes coupled by communications links, wherein messages pass between said nodes over said communications links, and wherein wherein a plurality of interlinked monitoring units are coupled to said communications links, said monitoring units capturing said messages on said communications links and correlating associated ones of said captured messages;

said method comprising the steps of:
filtering said messages using preselected profiles, wherein said profiles comprise message destination data to be used when filtering said messages;

tracking, at a first monitoring unit, a number of messages sent to a plurality of destinations during a particular period of time;

detecting, at said first monitoring unit, when said number of messages sent to a particular one of said plurality of destinations exceeds a first threshold level;

designating said first monitoring unit as a master monitoring unit for said particular destination, wherein other of the plurality of monitoring units forward information the master regarding all future detections of messages sent to said particular destination;

detecting, at said first monitoring unit, when said number of messages sent to said particular destination exceeds a second threshold level; and when said number of messages exceeds said second threshold level, directing one or more originating network nodes to reduce a number of future calls to said destination, wherein said originating nodes originate or forward said messages sent to said particular destination.

2. The method of claim 1 wherein said message destination data comprises telephone number digits, and wherein a high message traffic level corresponds to a mass call condition to one or more telephones assigned said telephone number digits.

3. The method of claim 1 wherein said message destination data corresponds to one or more of said network nodes, and wherein a high message traffic level corresponds to mass transaction onset condition for said nodes.

4. The method of claim 1 wherein said destination data is configurable by a user.

5. The method of claim 1 wherein said period of time is configurable by a user.

6. The method of claim 1 wherein said network nodes are selected from the group consisting of:
- a Signal Transfer Point (STP);
- a Signal Control Point (SCP);
- a Service Switching Point (SSP);
- an Intelligent Peripheral (IP);
- a Service Node (SN); and
- an end office.

7. The method of claim 1 wherein said filtering step, said tracking step and said detecting step are performed by a processor on one of said monitoring units.

8. The method of claim 1 further comprising the step of:
tracking numbers of messages sent to multiple destinations during said particular period of time.

9. A system for monitoring message traffic levels in a communications network having a plurality of nodes, said network nodes coupled by communications links, wherein messages pass between said nodes over said communications links, and wherein a plurality of interlinked monitoring units are coupled to said communications links, said monitoring units capturing said messages on said communications links and correlating associated ones of said captured messages;

said system comprising:
means for filtering said messages using preselected profiles, wherein said profiles comprise message destination data to be used when filtering said messages;

means for tracking, at a first monitoring unit, a number of messages sent to a plurality of destinations during a particular period of time;

means for detecting, at said first monitoring unit, when said number of messages sent to a particular one of said plurality of destinations exceeds a first threshold level;

means for designating said first monitoring unit as a master monitoring unit for said particular destination, wherein other of the plurality of monitoring units forward information the master regarding all future detections of messages sent to said particular destination;

means for detecting, at said first monitoring unit, when said number of messages sent to said particular destination exceeds a second threshold level; and means for directing one or more originating network nodes to reduce a number of future calls to said particular destination when said number of messages exceeds said second threshold level, wherein said originating nodes originate or forward said messages sent to said particular destination.

10. The system of claim 9 wherein said message destination data comprises telephone number digits, and wherein a high message traffic level corresponds to a mass call condition to one or more telephones assigned said telephone number digits.

11. The system of claim 9 wherein said message destination data corresponds to one or more of said network nodes, and wherein a high message traffic level corresponds to mass transaction onset condition for said nodes.

12. The system of claim 9 further comprising:
means for allowing users to configure said destination data.

13. The system of claim 9 further comprising:
means for allowing users to configure said period of time.

14. The system of claim 9 wherein said network nodes are selected from the group consisting of:
- a Signal Transfer Point (STP);
- a Signal Control Point (SCP);
- a Service Switching Point (SSP);
- an Intelligent Peripheral (IP);
- a Service Node (SN); and
- an end office.

15. The system of claim 12 wherein said monitoring units comprise a processor; and wherein said processors comprises said means for filtering, said means for tracking and said means for detecting.

16. The system of claim 8 further comprising:
means for tracking numbers of messages sent to multiple destinations during said particular period of time.

17. A computer readable medium having a computer program thereon for use in a system for monitoring a communications network having a plurality of network nodes, each of said nodes coupled by communications links, and wherein one or more monitoring units are coupled to said communications links and are operable to capture messages passing across said communications links, the computer program comprising:

means for filtering said messages using preselected profiles, wherein said profiles comprise message destination data to be used when filtering said messages;

means for tracking, at a first monitoring unit, a number of messages sent to a plurality of destinations during a particular period of time;

means for detecting, at said first monitoring unit, when said number of messages sent to a particular one of said plurality of destinations exceeds a first threshold level;

means for designating said first monitoring unit as a master monitoring unit for said particular destination, wherein other of the plurality of monitoring units forward information the master regarding all future detections of messages sent to said particular destination;

means for detecting, at said first monitoring unit, when said number of messages sent to said particular destination exceeds a second threshold level; and means for directing one or more originating network nodes to reduce a number of future calls to said particular destination when said number of messages exceeds said second threshold level, wherein said originating nodes originate or forward said messages sent to said particular destination.

18. The computer readable medium of claim 17 further comprising:
means for allowing users to configure said profiles.

19. The computer readable medium of claim 18 wherein said configuring means further comprises:
means for configuring said destination data; and
means for configuring said period of time.

* * * * *